US009628224B2

(12) United States Patent
Lee et al.

(10) Patent No.: US 9,628,224 B2
(45) Date of Patent: Apr. 18, 2017

(54) DEVICE AND METHOD FOR OPTIMIZING COMPRESSION LEVEL OF HARQ SIGNAL

(71) Applicants: Hae Chul Lee, Gyeonggi-do (KR); Chae Hag Yi, Gyeonggi-do (KR); Hee Gu Kang, Gyeonggi-do (KR); Jae Young Lee, Gyeonggi-do (KR)

(72) Inventors: Hae Chul Lee, Gyeonggi-do (KR); Chae Hag Yi, Gyeonggi-do (KR); Hee Gu Kang, Gyeonggi-do (KR); Jae Young Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 269 days.

(21) Appl. No.: 14/313,542

(22) Filed: Jun. 24, 2014

(65) Prior Publication Data

US 2015/0109996 A1 Apr. 23, 2015

(30) Foreign Application Priority Data

Oct. 22, 2013 (KR) .......................... 10-2013-0125739

(51) Int. Cl.
*H04L 1/18* (2006.01)
*H04L 27/38* (2006.01)
*H04L 1/20* (2006.01)

(52) U.S. Cl.
CPC .......... *H04L 1/1825* (2013.01); *H04L 1/1845* (2013.01); *H04L 27/38* (2013.01); *H04L 1/20* (2013.01)

(58) Field of Classification Search
CPC ....... H04L 1/1825; H04L 1/1845; H04L 1/20; H04L 27/38

(Continued)

(56) References Cited

U.S. PATENT DOCUMENTS 8,255,788 B2  8/2012  Revis
8,291,278 B2  10/2012  Cho et al.

(Continued)

FOREIGN PATENT DOCUMENTS

EP           01393472 B1    1/2002
KR      1020030005171 A     1/2003

(Continued)

*Primary Examiner* — Kan Yuen
*Assistant Examiner* — Richard Chang
(74) *Attorney, Agent, or Firm* — The Farrell Law Firm, P.C.

(57) ABSTRACT

A device for optimizing a data compression level when processing a Hybrid Automatic Repeat reQuest (HARQ) signal includes a combiner which receives a log likelihood ratio (LLR) signal, determines whether the LLR signal is a new or retransmitted signal, and generates a composite signal by combining the LLR signal with a related signal received and previously stored when the LLR signal is the retransmitted signal; a compression level decision unit which calculates a first compression level based on quality of a received signal, calculates a second compression level based on an available memory size, and decides a final compression level according to the first compression level and the second compression level; a compressor which compresses the LLR signal according to the final compression level; a HARQ memory which stores the compressed signal; and a decompressor which decompresses a signal read from the HARQ memory.

21 Claims, 11 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2010/0005356 A1* | 1/2010 | Cho ................. | H03M 13/6306 714/749 |
| 2010/0278230 A1 | 11/2010 | MacInnis et al. | |
| 2012/0047408 A1* | 2/2012 | Wilborn ............ | H03M 13/6525 714/718 |
| 2012/0331241 A1 | 12/2012 | Majonen | |

FOREIGN PATENT DOCUMENTS

| | | |
|---|---|---|
| KR | 1020050094240 A | 9/2005 |
| KR | 1020100046967 A | 7/2010 |
| KR | 20120135237 A | 12/2012 |
| KR | 101223259 B1 | 1/2013 |
| WO | WO 02/091627 A1 | 11/2002 |

* cited by examiner

FIG. 5

| MEMORY REGION ID | OB | HARQ ID |
|---|---|---|
| 1 | 1 | 0 |
| 2 | 1 | 0 |
| 3 | 1 | 0 |
| 4 | 0 | |
| 5 | 1 | 2 |
| 6 | 1 | 2 |
| 7 | 0 | |

DEVICE AND METHOD FOR OPTIMIZING COMPRESSION LEVEL OF HARQ SIGNAL

PRIORITY

This application claims priority under 35 U.S.C. §119(a) to Korean Patent Application No. 10-2013-0125739 filed in the Korean Intellectual Property Office on Oct. 22, 2013, the entire disclosure of which is incorporated herein by reference.

BACKGROUND

1. Field of the Invention

The present invention generally relates to a wireless communication device, and more particularly, to a device and method for receiving and processing a Hybrid Automatic Repeat reQuest (HARQ) signal in a wireless communication device.

2. Description of the Related Art

HARQ is a transmission method that improves a delay problem in an upper layer by adding channel coding for utilizing an error packet to existing Automatic Repeat reQuest (ARQ). HARQ is used in mobile communication standards such as High Speed Packet Access (HSPA) and Long Term Evolution (LTE). In HARQ scheme, an error packet received in a previous process is stored in a form of a log likelihood ratio (LLR) signal. With the increase of transmission speed in mobile communication, the size of HARQ memory has increased.

A mobile communication terminal usually includes an HARQ signal processor to process HARQ burst data. The HARQ signal processor requires HARQ memory to store data for the processing of the HARQ burst data. To reduce the size of the HARQ memory, the LLR signal is compressed when is stored. The compression of the LLR signal may lead to the deterioration of reception performance.

SUMMARY

The present invention has been made to address the above problems and disadvantages and to provide at least the advantages described below. Accordingly, an aspect of the present invention provides a device for changing the compression level of a log likelihood ratio (LLR) signal when processing a Hybrid Automatic Repeat reQuest (HARQ) signal, thereby reducing performance deterioration due to the compression of the LLR signal and efficiently using a HARQ memory, and a method thereof.

According to an aspect of the present invention a device for receiving and processing HARQ signal is provided. The device includes a combiner configured to receive an LLR signal, to determine whether the LLR signal is a new signal or a retransmitted signal, and to generate a composite signal by combining the LLR signal with a related signal that has been received and previously stored when the LLR signal is the retransmitted signal; a compression level decision unit configured to calculate a first compression level based on quality of a received signal, to calculate a second compression level based on an available memory size, and to decide a final compression level according to the first compression level and the second compression level; a compressor configured to compress the LLR signal according to the final compression level; an HARQ memory configured to store the compressed signal; and a decompressor configured to decompress a signal read from the HARQ memory.

According to another aspect of the present invention, a method of receiving and processing an HARQ signal is provided. The method includes receiving an LLR signal and determining whether the LLR signal is a new signal or a retransmitted signal; generating a composite signal by combining the LLR signal with a related signal that has been received and previously stored when the LLR signal is the retransmitted signal; deciding a final compression level based on a required compression level calculated based on quality of a received signal and an available compression level calculated based on an available memory size; and compressing the LLR signal according to the final compression level and storing the compressed signal in a memory.

According to another aspect of the present invention a wireless communication device includes a demodulator configured to demodulate a received signal and generate a demodulated signal; an LLR demapper configured to remap the demodulated signal to an LLR signal of N bits, where N is a real number of at least 1; an HARQ processing device configured to receive the LLR signal, to determine whether the LLR signal is a new signal or a retransmitted signal, and to generate a composite signal by combining the LLR signal with a related signal that has been received and previously stored in a memory before when the LLR signal is the retransmitted signal; and a decoder configured to decode an output signal of the HARQ processing device.

BRIEF DESCRIPTION OF THE DRAWINGS

The above and other aspects, features and advantages of the present invention will become more apparent by describing in detail embodiments thereof with reference to the attached drawings in which:

FIG. 5 is a diagram of a memory divided into a plurality of memory regions for management according to an embodiment of the present invention;

DETAILED DESCRIPTION OF EMBODIMENTS OF THE PRESENT INVENTION

Figure 1:
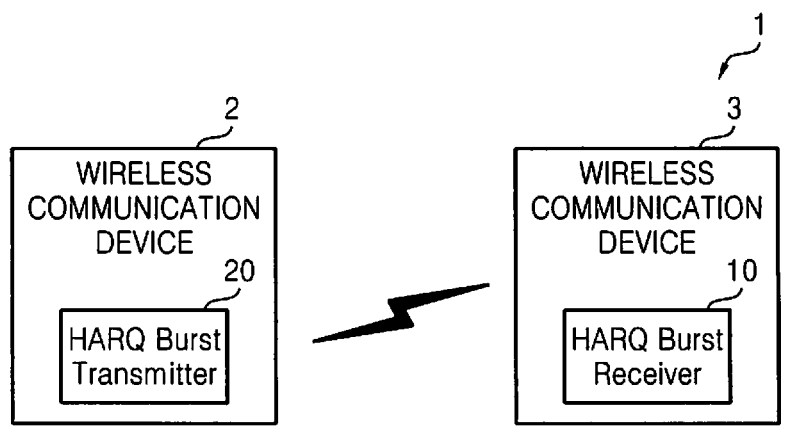
FIG. 1 is a schematic block diagram of a wireless communication system according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like reference numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be referred to as a second signal, and, similarly, a second signal could be referred to as a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present description, and will not be interpreted in an idealized or overly formal sense unless expressly so defined herein.

FIG. 1 is a schematic block diagram of a wireless communication system 1 according to an embodiment of the present invention. The wireless communication system 1 includes a first wireless communication device 2 and a second wireless communication device 3. The wireless communication system 1 may be a mobile communication system using mobile communication standards such as High Speed Packet Access (HSPA) and Long Term Evolution (LTE), but the present invention is not restricted thereto. The first wireless communication device 2 may be a base station and the second wireless communication device 3 may be a mobile communication terminal, but the present invention is not restricted thereto.

A Hybrid Automatic Repeat reQuest (HARQ) burst transmitter 20 included in the first wireless communication device (e.g., a base station) 2 transmits HARQ burst data to the second wireless communication device (e.g., a terminal) 3 through a downlink channel. AHARQ processor (or HARQ burst receiver) 10 included in the second wireless communication device 3 receives the HARQ burst data and transmits an ACK or NACK to the HARQ burst transmitter 20 with respect to the HARQ burst data. The HARQ burst transmitter 20 schedules retransmission of the HARQ burst or transmission of new HARQ burst data based on the ACK or NACK. Although not shown, the HARQ processor 10 may be embedded in a network device (e.g., a modem chip).

Figure 2A:
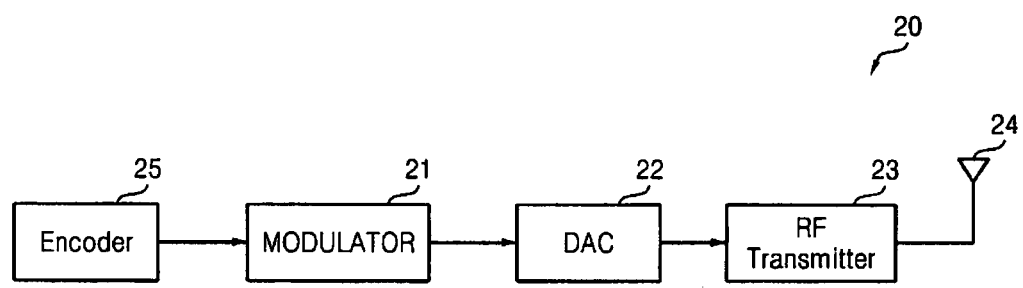
FIG. 2A is a block diagram of a Hybrid Automatic Repeat reQuest (HARQ) burst transmitter illustrated in FIG. 1 according to an embodiment of the present invention.

FIG. 2A is a block diagram of the HARQ burst transmitter 20 illustrated in FIG. 1 according to an embodiments of the present invention. Referring to FIG. 2A, the HARQ burst transmitter 20 includes an encoder 25, a modulator 21, a digital-to-analog converter (DAC) 22, and a radio frequency (RF) transmitter 23. The encoder 25 performs channel coding on input data for correction of an error occurring in a radio channel. The modulator 21 modulates a channel-coded digital signal output from the encoder 25 according to a predetermined modulation method. For instance, the modulator 21 may map the digital signal to an M-ary quadrature amplitude modulation (M-QAM) (where M is an integer of at least 2, e.g., 16) signal. The DAC 22 converts a signal (e.g., a QAM signal) output from the modulator 21 into an analog signal.

The RF transmitter 23 converts the analog signal output from the DAC 22 into an RF signal and transmits the RF signal through an antenna 24. The RF transmitter 23 may perform power amplification and filtering on the RF signal before outputting the RF signal to the antenna 24.

Figure 2B:
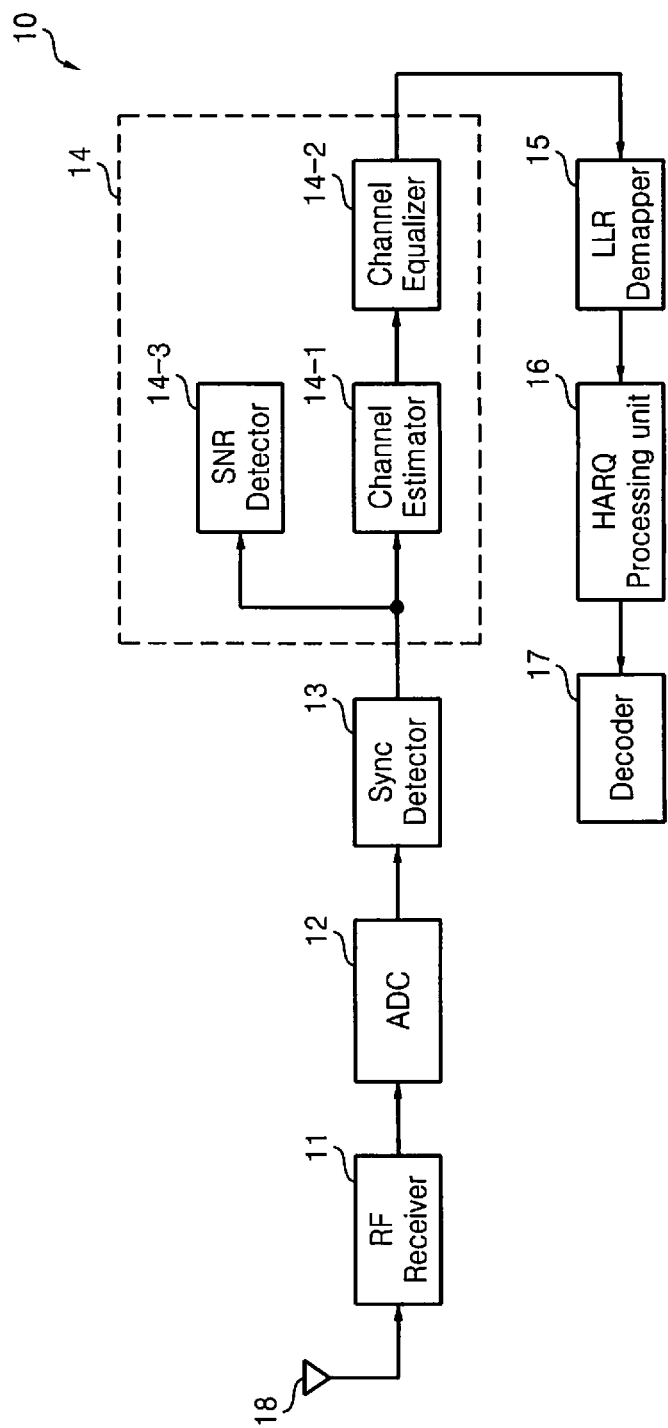
FIG. 2B is a block diagram of a HARQ processor illustrated in FIG. 1 according to an embodiment of the present invention.

FIG. 2B is a block diagram of the HARQ processor 10 illustrated in FIG. 1 according to an embodiments of the present invention. Referring to FIG. 2B, the HARQ processor 10 includes an RF receiver 11, an analog-to-digital converter (ADC) 12, a sync detector 13, a demodulator 14, a log likelihood ratio (LLR) demapper 15, a HARQ processing unit 16, and a decoder 17. The demodulator 14 may include a channel estimator 14-1, a channel equalizer 14-2, and a signal-to-noise ratio (SNR) detector 14-3.

The RF receiver 11 receives an RF signal through an antenna 18 and converts it into a baseband signal. The RF receiver 11 may perform filtering and low noise amplification (LNA) on the RF signal before converting it into the baseband signal. The ADC 12 converts an output signal of the RF receiver 11 into digital data.

The sync detector 13 detects a sync signal for synchronization of a received signal. The channel estimator 14-1 estimates attenuation or distortion of the signal's amplitude or distortion of the signal's phase, which occur in a channel, and generates a channel estimated signal. The channel equalizer 14-2 compensates the channel using the channel estimated signal output from the channel estimator 14-1, thereby generating a channel-compensated demodulated signal. The demodulated signal output from the channel equalizer 14-2 may be an M-QAM signal. The SNR detector 14-3 detects an SNR or a signal-to-interference plus noise ratio (SINR) of a received signal.

The LLR demapper 15 receives the demodulated signal (e.g., the M-QAM signal) and remaps the demodulated signal to an N-bit LLR soft bit signal (hereinafter, referred to as an LLR signal). In other words, the LLR demapper 15 may calculate an LLR from the demodulated signal and output an N-bit LLR signal (LLRr in FIG. 3).

The HARQ processing unit 16 receives the LLR signal and determines whether the LLR signal is new or has been retransmitted. When it is determined that the LLR signal is new, the HARQ processing unit 16 outputs the LLR signal to the decoder 17. When it is determined that the LLR signal has been retransmitted, the HARQ processing unit 16 combines the LLR signal with a related signal that has been received and stored and outputs a composite signal to the decoder 17. The decoder 17 decodes the signal output from the HARQ processing unit 16.

Figure 3:
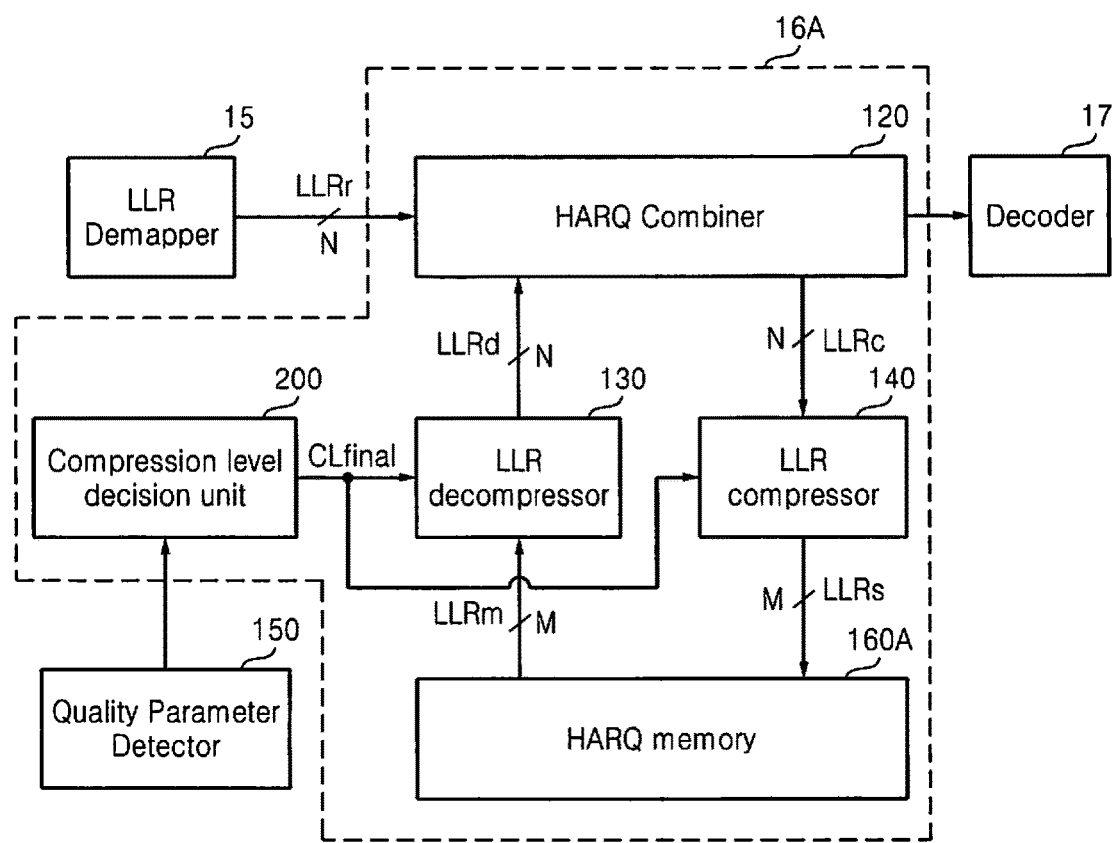
FIG. 3 is a block diagram of a HARQ processing unit according to an embodiment of the present invention.
Figure 4:
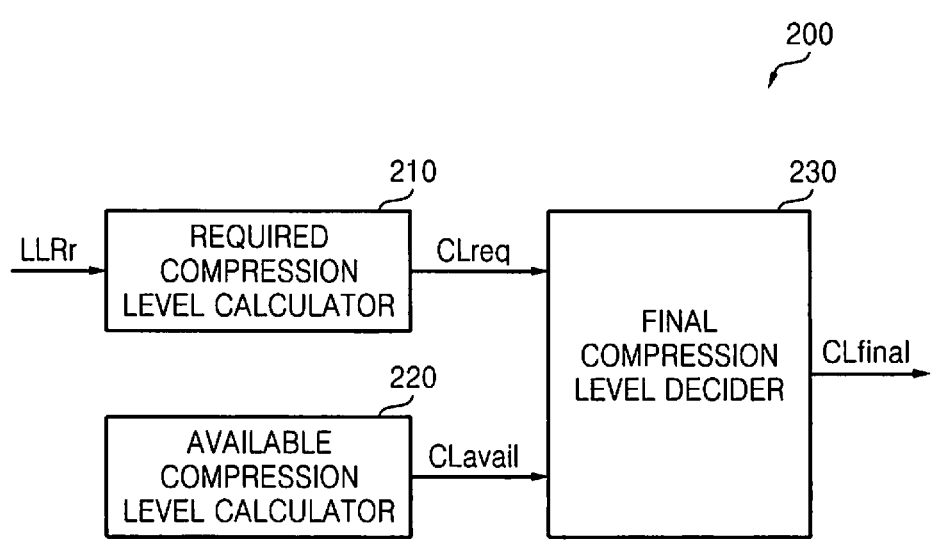
FIG. 4 is a block diagram of a compression level decision unit illustrated in FIG. 3 according to an embodiment of the present invention.

FIG. 3 is a block diagram of a HARQ processing unit 16A according to an embodiment of the present invention. FIG. 4 is a block diagram of a compression level decision unit 200 illustrated in FIG. 3 according to an embodiments of the present invention.

Referring to FIGS. 3 and 4, the HARQ processing unit 16A includes a HARQ combiner 120, an LLR compressor 140, an LLR decompressor 130, an HARQ memory 160A, and a compression level decision unit 200. The HARQ processing unit 16A may also include a quality parameter detector 150. The quality parameter detector 150 calculates or detects quality parameters which will be described below.

The HARQ combiner 120 receives a HARQ burst represented with the N-bit LLR signal LLRr from the LLR demapper 15. The HARQ combiner 120 also combines a current LLR signal with a corresponding LLR signal (i.e., a related signal) that has been received and previously stored in the HARQ memory 160A. For instance, the HARQ combiner 120 receives an LLR signal and determines whether the LLR signal is new, that is, has been transmitted for a first time or has been retransmitted. When it is determined that the LLR signal has been retransmitted, the HARQ combiner 120 combines the LLR signal with the related signal that has been received and stored in the HARQ memory 160A to generate a composite signal.

The LLR compressor 140 compresses an N-bit LLR signal LLRc into an M-bit LLR signal LLRs according to a final compression level CLfinal output from the compression level decision unit 200 and stores the M-bit LLR signal LLRs in the HARQ memory 160A. Here, M is less than or equal to N. When M is equal to N, it may be said that compression has not been performed. When M is less than N, it may be said that compression has been performed. The N-bit LLR signal LLRc may be a new signal or a composite signal.

The LLR decompressor 130 decompresses an M-bit LLR signal LLRm that has been compressed by the LLR compressor 140 and stored in the HARQ memory 160A to restore an N-bit LLR signal LLRd before compression. Like the LLR compressor 140, the LLR decompressor 130 decompresses the M-bit LLR signal LLRm into the N-bit LLR signal LLRd according to the final compression level CLfinal output from the compression level decision unit 200. The final compression level CLfinal used for decompression is the same as that used for compression.

The compression level decision unit 200 decides a compression level for the LLR signal LLRc output from the HARQ combiner 120. Referring to FIG. 4, the compression level decision unit 200 includes a required compression level calculator 210, an available compression level calculator 220, and a final compression level decider 230.

The required compression level calculator 210 calculates a first compression level CLreq according to the quality of a received signal. Here, the received signal may be the LLR signal LLRc output from the HARQ combiner 120 or one of signals processed by the HARQ processor 10 illustrated in FIG. 2B. The first compression level CLreq may be a compression level required to maintain the quality of the signal above at least a certain level after compression. Accordingly, the first compression level CLreq is also referred to as a required compression level.

The quality of the received signal may be expressed as a quality metric considering the SNR and SINR of the received signal, the transmission block size of the received signal, the order of modulation, a code rate, a retransmission count, a channel profile, Doppler frequency, and so on. Accordingly, the required compression level calculator 210 calculates the quality metric of the received signal using at least one quality parameter output from the quality parameter detector 150.

A quality metric (QM) of a received signal may be defined as Equation (1):

$$QM = f(\text{SNR of the received signal, SINR of the received signal, transmission block size, order of modulation, code rate, retransmission count, channel profile, Doppler frequency}). \quad (1)$$

As shown in Equation (1), the QM of the received signal may be determined based on at least one of the SNR of the received signal, the SINR of the received signal, the transmission block size of the received signal, the order of modulation, the code rate, the retransmission count, the channel profile, and the Doppler frequency. In other words, the QM of the received signal is the function of at least one predetermined quality parameter. The quality parameter may be the SNR of the received signal, the SINR of the received signal, the transmission block size of the received signal, the order of modulation, the code rate, the retransmission count, the channel profile, or the Doppler frequency, as shown in Equation (1), but the present invention is not restricted thereto. Parameters may be added or removed according to embodiments of the present invention.

The function "f" may be predetermined through tests or simulations. Accordingly, the required compression level calculator 210 calculates a QM by applying predetermined quality parameters, such as the SNR of the received signal, the SINR of the received signal, the transmission block size of the received signal, the retransmission count, the order of modulation, the code rate, the channel profile, and the Doppler frequency, which influence the QM, to a predetermined algorithm. Alternatively, quality metrics according to the predetermined quality parameters, such as the SNR of the received signal, the SINR of the received signal, the transmission block size of the received signal, and the retransmission count, may be formed in a lookup table.

Some (e.g., the transmission block size, the retransmission count, the order of modulation, the code rate) of the quality parameters may be predetermined while others (e.g., the SNR of the received signal, the SINR of the received signal, the channel profile, and the Doppler frequency) of the quality parameters may be measured or calculated by the quality parameter detector 150. The quality parameter detector 150 may include the SNR detector 14-3 illustrated in FIG. 2B.

A QM calculated using Equation (1) may be, for example, a throughput, a block transmission success rate (100%—block error rate (BLER)), a bit transmission success rate (100%—bit error rate (BER)), or an effective SNR.

In the current embodiments, (K+1) available compression levels (e.g., compression levels 0 through K) may be predetermined taking into account a HARQ memory size, the number of (N) LLR bits, and the performance of a receiver. For instance, compression level 0 indicates no compression, that is, that N LLR bits are output as they are. Compression level 1 indicates that N LLR bits compressed into $M_1$ bits and compression level 2 indicates that N LLR bits compressed into $M_2$ bits. Here, the relationship of $N > M_1 > M_2 > \ldots > M_K$ is satisfied. In other words, when the compression level increases, the number of bits in a compressed LLR signal decreases and the compression ratio increases.

It is usually said that the quality of a received signal is good when the SNR of the received signal and the retransmission count are high and the transmission block size of the received signal is small. The QM at this time has a high value.

When the QM of the received signal has a high value, reception performance is not deteriorated even when the received LLR signal LLRr is compressed into a lower number of bits, and therefore, the compression level can be increased. Contrarily, when the QM of the received signal has a low value, the compression level is decreased to prevent the reception performance from deteriorating.

The compression level determined based on the QM of a received signal may be defined as the required compression level CLreq, as described above, and may be expressed as a function relation given by Equation (2):

$$CLreq=g(QM \text{ of received signal}). \tag{2}$$

Since the number of bits of a required LLR signal may vary with the performance of a receiver, the required compression level CLreq may be determined depending on the QM of a received signal and the performance of the receiver. In Equation (2), 'g' is a function for defining relationship between the required compression level CLreq and the QM.

As described above, the required compression level calculator 210 calculates the QM of a received signal and decides and outputs the required compression level CLreq according to the calculated QM of the received signal. For instance, the required compression level calculator 210 may determine, as the required compression level CLreq, a highest compression level that satisfies the calculated QM of the received signal among K predetermined compression levels, e.g., 0 through K. The number of LLR bits determined by the required compression level CLreq is represented with $M_R$.

The available compression level calculator 220 calculates a second compression level CLavail according to an available memory size. The second compression level CLavail may be used for the size of a compressed signal not to exceed the available memory size.

Assuming that a total number of LLR signals to be stored is "$N_{LLR}$" and the size of the HARQ memory that can be used to store the LLR of a received signal is "Mavail", a single LLR signal can be stored in "Mavail/$N_{LLR}$" bits, taking the available HARQ memory size into account. The size of the HARQ memory that can be used to store LLR signals may be referred to as an available memory size Mavail and may be obtained by subtracting a used memory capacity from a total memory size. Accordingly, "Mavail/$N_{LLR}$" may be an available memory size per one LLR signal and a compression bit number corresponding to the highest value among values less than or equal to "Mavail/$N_{LLR}$" or a compression level having the compression bit number may be defined as the available compression level CLavail.

The HARQ memory 160A is embedded in the HARQ processing unit 16A or in a modem including the HARQ processing unit 16A. The HARQ memory 160A stores the compressed LLR signal LLRs output from the LLR compressor 140. The HARQ memory 160A may be divided into a predetermined size by which the use of memory is managed. For instance, the HARQ memory 160A may be divided into a plurality of memory regions of the predetermined size, and a signal (e.g., an occupied bit) indicating availability or validity may be used for each memory region.

FIG. 5 is a diagram of memory divided into a plurality of memory regions for management according to an embodiment of the present invention. Referring to FIG. 5, an Occupied Bit (OB) and a HARQ IDentifier (ID) (having one of values 1 through 7) are used for each of the memory regions to manage the use state of each memory region.

When a memory region is being used, that is, an LLR signal is effectively stored in the memory region, the OB of the memory region may be set to "1" to indicate that the memory region is being used. In addition, a HARQ ID of the LLR signal stored in the memory region may be stored with respect to the memory region.

Meanwhile, when the memory region is not used any more, the OB of the memory region may be set to "0" to indicate that the memory region is available. The final compression level decider 230 decides the final compression level CLfinal based on the first compression level CLreq and the second compression level CLavail.

The final compression level decider 230 determines a compression level corresponding to a higher compression ratio between the required compression level CLreq and the available compression level CLavail as the final compression level CLfinal. For instance, when the required compression level CLreq corresponds to a higher compression ratio than the available compression level CLavail, the final compression level decider 230 determines the required compression level CLreq as the final compression level CLfinal. Accordingly, the LLR compressor 140 compresses the N-bit LLR signal LLRc into the LLR signal LLRs with a required compression bit number, thereby reducing the usage of the HARQ memory 160A without deteriorating the reception performance. The required compression bit number is the number of bits per LLR signal corresponding to the required compression level CLreq. According to embodiments of the present invention, the required compression level CLreq itself may indicate the required compression bit number.

When the required compression level CLreq corresponds to a lower compression ratio than the available compression level CLavail, the final compression level decider 230 determines the available compression level CLavail as the final compression level CLfinal. Accordingly, the LLR compressor 140 compresses the N-bit LLR signal LLRc into the LLR signal LLRs with an available compression bit number, so that the LLR signal LLRs can be stored in the HARQ memory 160A although deterioration of the reception performance occurs. The available compression bit number is the number of bits per LLR signal corresponding to the available compression level CLavail. According to embodiments of the present invention, the available compression level CLavail itself may indicate the available compression bit number.

Figure 6:
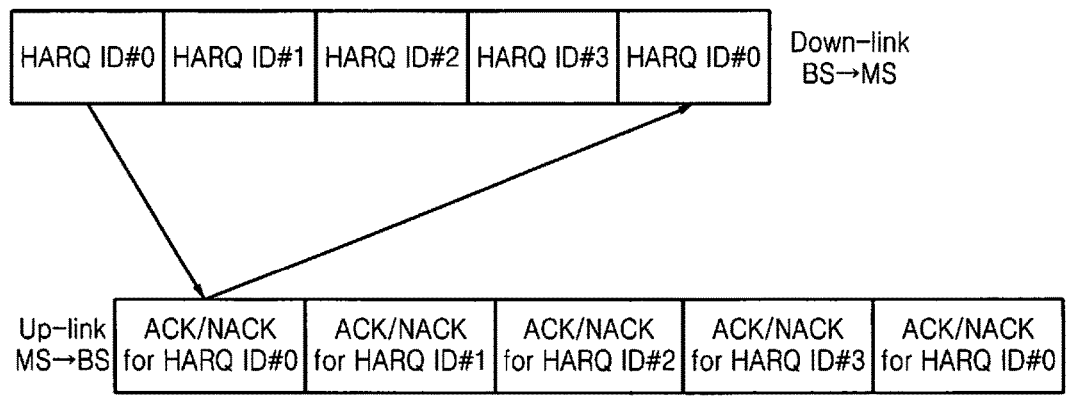
FIG. 6 is a diagram explaining a method of transmitting a HARQ burst.

FIG. 6 is a diagram explaining a method of transmitting a HARQ burst. Referring to FIGS. 1 through 6, the HARQ burst transmitter 20 (FIG. 1) transmits HARQ burst data to the HARQ burst receiver 10, i.e., HARQ burst transmitter 20 using a plurality of (i.e., at least two) HARQ channels. The plurality of HARQ channels are identified by a HARQ ID as shown in FIG. 5.

When receiving a HARQ burst through a HARQ channel, the HARQ processor 10 transmits an ACK/NACK to the HARQ burst transmitter 20 with respect to the received HARQ burst. The HARQ burst transmitter 20 schedules retransmission of the old HARQ burst or transmission of a new HARQ burst based on the ACK/NACK received from the HARQ processor 10.

FIG. 6 illustrates the concept of transmitting an HARQ burst using four HARQ IDs. The present invention is not restricted to the current embodiments and the number of HARQ IDs may be changed.

The HARQ combiner 120 determines whether a received signal is a new signal or a retransmitted signal according to a HARQ ID (or a HARQ channel ID) of the received signal, reads an LLR signal corresponding to the HARQ ID from the HARQ memory 160A when it is determined that the received signal is the retransmitted signal, and generates a composite signal by combining the LLR signal with the retransmitted signal. At this time, when the LLR signal that has been read is a compressed signal, the LLR signal is decompressed before being combined with the retransmitted signal. The composite signal is compressed by the LLR compressor 140 and then stored in the HARQ memory 160A.

The output signal of the HARQ combiner 120 is also applied to the decoder 17 and is decoded by the decoder 17. When the decoding result is normal (i.e., the cyclic redundancy check (CRC) is good) in the decoder 17, that is, when there is no error, the current signal is erased or flushed from the HARQ memory 160A. In an otherwise case (i.e., CRC bad), the current signal is retained in the HARQ memory 160A so that it can be used for the next combining When there is no error in the decoding result of the decoder 17, for instance, an OB for a memory region in which the LLR signal has been stored is set to "0" to indicate that the memory region has been flushed.

Figure 7:
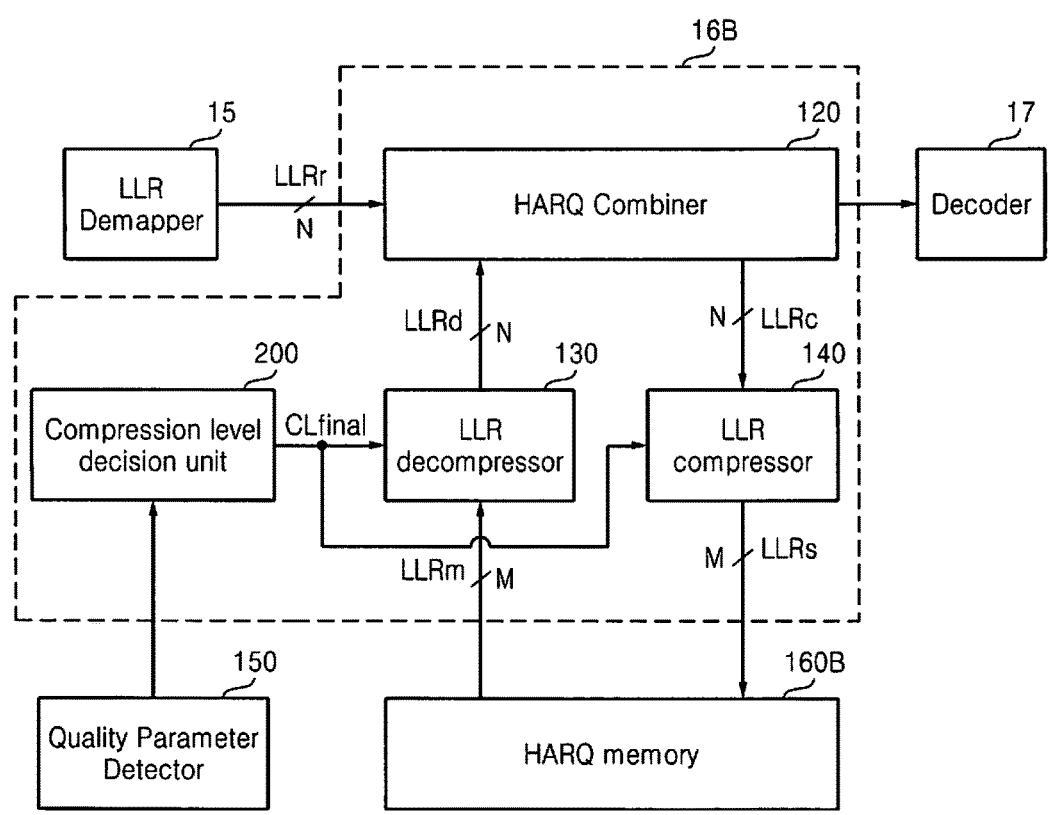
FIG. 7 is a block diagram of a HARQ processing unit according to another embodiment of the present invention.

FIG. 7 is a block diagram of the HARQ processing unit 16B according to another embodiment of the present invention. Referring to FIG. 7, the HARQ processing unit 16B includes the HARQ combiner 120, the LLR compressor 140, the LLR decompressor 130, and the compression level decision unit 200.

The HARQ processing unit 16B illustrated in FIG. 7 is similar to the HARQ processing unit 16A illustrated in FIG. 3. Thus, differences between the units 16B and 16A will be mainly described to avoid redundancy.

While the HARQ processing unit 16A illustrated in FIG. 3 uses the HARQ memory 160A embedded therein or embedded in a modem including the HARQ processing unit 16A, the HARQ processing unit 16B illustrated in FIG. 7 uses the HARQ memory 160B provided outside the HARQ processing unit 16B or outside a modem including the HARQ processing unit 16B.

Although not shown in FIG. 7, a cache may also be provided to function as a buffer between the HARQ processing unit 16B and the external HARQ memory 160B. In other embodiments, the HARQ processing unit 16 may use both the internal memory 160A and the external memory 160B.

Figure 8:
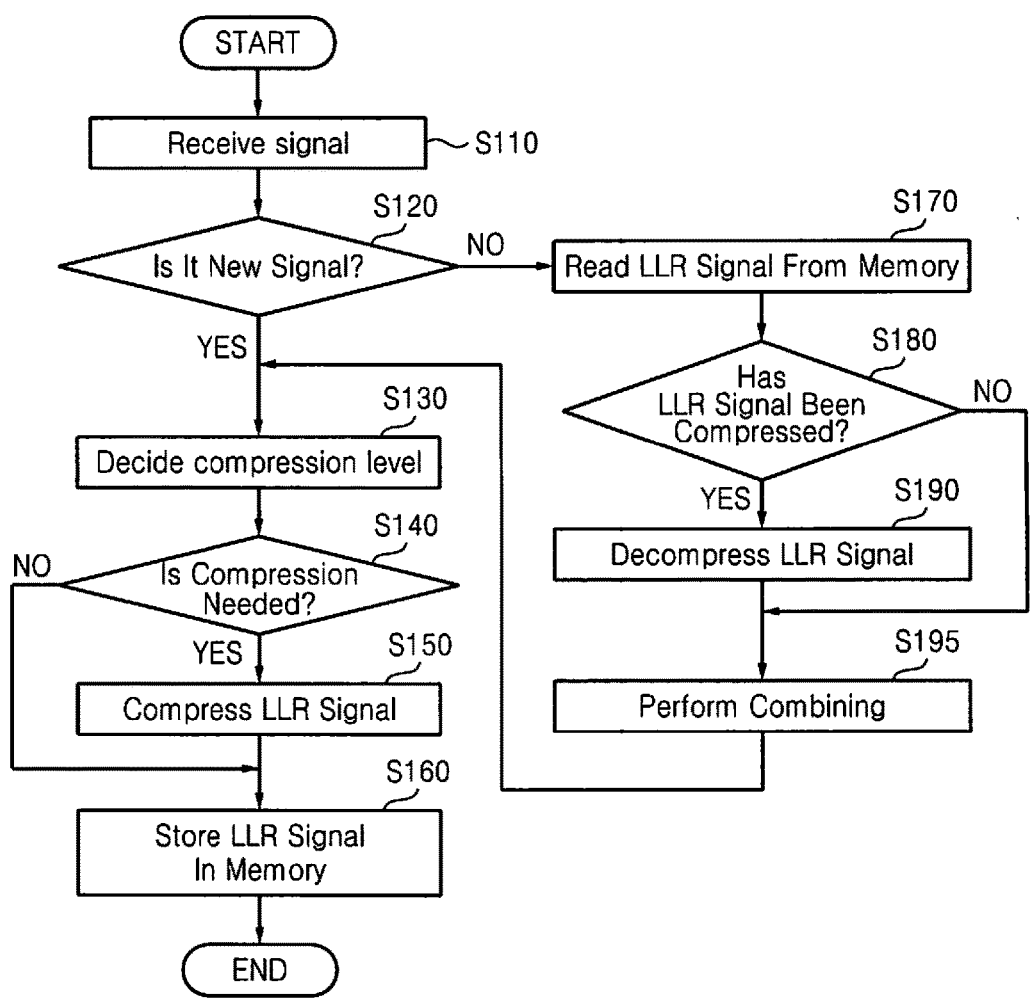
FIG. 8 is a flowchart of a method of processing HARQ data according to an embodiment of the present invention.

FIG. 8 is a flowchart of a method of processing HARQ data according to an embodiment of the present invention. The method illustrated in FIG. 8 may be performed by the HARQ processor 10.

When a HARQ signal is received in step S110, it is determined whether the received signal is a new signal or a retransmitted signal in step S120. When it is determined that the received signal is a new signal, the quality of the received signal is measured, a required compression level is obtained, an available compression level is obtained according to an available memory size, and then a compression level is decided in step S130. Deciding the compression level will be described with reference to FIG. 9 below.

In step S140, it is determined if compression is needed. If compression is needed, the received signal is compressed using the decided compression level in step S150. The decided compression level is the above-described final compression level CLfinal. The compressed LLR signal is stored in memory in step S160. Although not shown, an OB for a memory region in which the compressed signal has been stored, i.e., an OB for a used memory region may be set to "1" to indicate that the memory region is being used. Meanwhile, the received signal that has not been compressed is decoded. When the decoding is successful, the OB for the used memory region is set to "0" to indicate that the memory region is available.

When it is determined that the received signal is a retransmitted signal in step S120, an LLR signal that has been transmitted and stored in memory is read and decompressed in steps S170 through S190. After the LLR signal is read from a memory region in the memory, an OB for the memory region is set to "0". The retransmitted signal is combined with the decompressed signal to generate a composite signal in step S195.

The quality of the composite signal generated in step S195 is measured, a required compression level is obtained, an available compression level is obtained according to an available memory size, and then a compression level is decided in step S130. The composite signal is compressed using the decided compression level and then stored in a memory region of the memory in steps S140 through S160. An OB for the memory region may be set to "1" to indicate that the memory region is being used. Meanwhile, the composite signal that has not been compressed is decoded. When the decoding is successful, the OB for the used memory region is set to "0" to indicate that the memory region is available.

The above-described steps may be repeated until decoding of the received signal or the composite signal succeeds. For instance, the repetition may be continued up to a maximum retransmission count that is set in advance (for example, preset according to a standard) and when the maximum retransmission count is reached and the decoding fails, an OB for the used memory region is set to "0" to indicate that the memory region is available.

Figure 9:
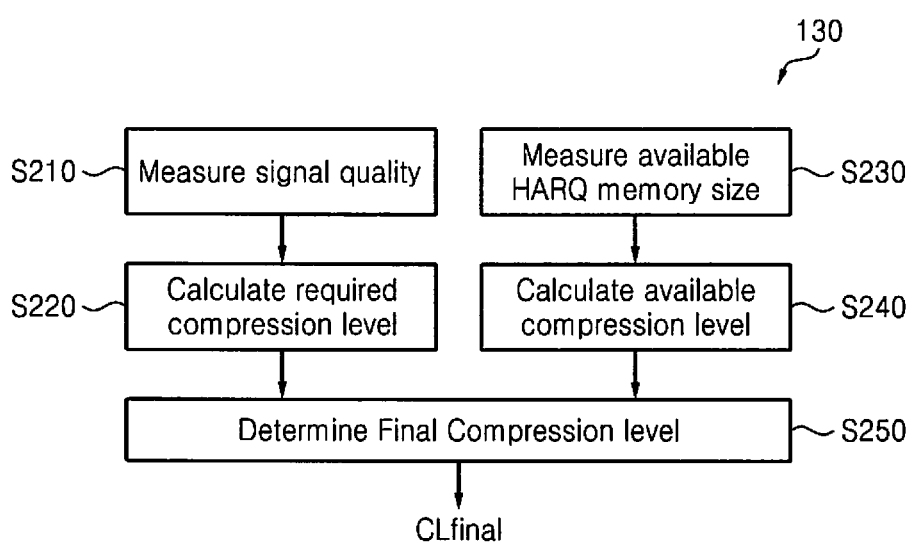
FIG. 9 is a flowchart of a method of deciding a compression level according to an embodiment of the present invention.

FIG. 9 is a flowchart of a method of deciding a compression level according to an embodiment of the present invention. Referring to FIG. 9, steps S210 and S220 of measuring the quality of a signal and calculating a required compression level may be performed in parallel with steps S230 and S240 of calculating an available compression level based on an available memory size. The signal may be a new signal or a composite signal.

Although not shown, initialization is performed before steps S210 through S240. In the initialization, selectable compression levels may be defined and functions or algorithms needed for the calculation of compression levels may be set. The initialization may be performed when a HARQ processor is powered up or before a HARQ signal is received after the HARQ processor is powered up.

In the initialization, N LLR compression levels may be arranged in a descending order of compression ratios, i.e., an ascending order of compression bit numbers and a k-th LLR compression level may be represented with "$CL_k$". A $CL_k$ value may indicate the number of bits in a compressed LLR signal. A set of $CL_k$ is given by Equation (3):

$$S=\{CL_1, CL_2, \ldots, CL_N\}. \qquad (3)$$

The quality of a signal may be measured by calculating the QM that has been described above in step S210. In detail, step S210 may include measuring an SNR or SINR of the signal, calculating a transmission block size of the signal, extracting the order of modulation, extracting a code rate, and extracting a retransmission count. In addition, other quality parameters, such as a channel profile and a Doppler frequency, influencing the QM, may be calculated in step S210.

The QM may be calculated by applying at least one quality parameter, such as the SNR or SINR of the signal, the transmission block size, and the retransmission count, to the predetermined function or algorithm in step S210.

The required compression level may be decided based on the calculated QM in step S220. The required compression level may be calculated by applying the QM to a predetermined function or algorithm or a compression level corresponding to the QM may be selected as the required compression level from a QM and a required compression level table that is set in advance.

The QM may be a throughput. In this case, LLR compression levels giving a maximum throughput may be obtained using the quality parameters, e.g., the transmission block size, the SNR, the channel profile, and the Doppler frequency, which have been calculated in step S210, in step S220. An LLR compression level with a least LLR bit number among the obtained LLR compression levels may be determined as the required compression level CLreq. This is given by Equation (4):

$$CLreq = \min_{CL_k}(S^{MAX-Tput}), \quad (4)$$

where $S_{MAX-Tput}$ is a set of LLR compression levels giving the maximum throughput and is a subset of S.

The available memory size at a current HARQ ID (i.e., IDh where h=0 through $N_{HARQ\_ID}-1$) is calculated in step S230. The HARQ ID is the HARQ channel identifier that has been described above. The available memory size, i.e., Mavail at the current HARQ ID may be calculated using Equation (5):

$$Mavail = Mtotal - \sum_{i=0, i \neq h}^{H_{HARQ-ID}-1} \sum_{t=1}^{N_{TB}[i]} (CLfinal[i][t] \times N_{LLR}[i][t]), \quad (5)$$

where "i", "t", Mtotal, $N_{HARQ\_ID}$, $N_{TB}$, and $N_{LLR}$ respectively denote a HARQ ID, a transmission block index, a total HARQ memory size, a total number of HARQ IDs, the number of transmission blocks, and the number of LLR signals. Accordingly, the available memory size Mavail is obtained by subtracting the size of memory occupied by HARQ IDs (i.e., IDi where i≠h) other than the current HARQ ID IDh from the total HARQ memory size Mtotal.

The available compression level CLavail is calculated using the available memory size Mavail, which has been calculated in step S230, in step S240. The available compression level CLavail may be calculated using Equation (6):

$$CLavail[h] = \max_{CL_k}\left[CL_k \leq \frac{Mavail}{\sum_{t=1}^{N_{TB}[h]} N_{LLR}[h][t]}\right]. \quad (6)$$

In other words, among LLR compression levels $CL_k$ less than or equal to a value obtained by dividing the available memory size Mavail by a total number of LLR signals (i.e., the sum of the numbers of LLR signals in all transmission blocks), a maximum value, i.e., $\max_{CL_k}$ is obtained and determined as the available compression level CLavail. The value obtained by dividing the available memory size Mavail by the total number of LLR signals may be the number of bits available for each LLR signal.

When the available compression level CLavail and the required compression level CLreq are calculated in steps S240 and S230, respectively, the final compression level CLfinal is determined using the available compression level CLavail and the required compression level CLreq in step S250. When the required compression level CLreq is lower than the available compression level CLavail, the required compression level CLreq may be determined as the final compression level CLfinal in step S250.

In detail, when the sum of required compression levels CLreq for respective transmission blocks is less than the product of the available compression level CLavail and the number of transmission blocks, i.e., the transmission block number $N_{TB}$, the required compression level CLreq is determined as the final compression level CLfinal, as given by Equation (7):

$$\text{if } \sum_{t=1}^{N_{TB}[h]} CLreq[h][t] \leq CLavail[h] \cdot N_{TB}, \quad (7)$$

for $t = 1 : N_{TB}[h]$ $CLfinal[h][t] = CLreq[h][t]$.

However, when the required compression level CLreq is higher than the available compression level CLavail, the available compression level CLavail may be determined as the final compression level CLfinal. For instance, when the transmission block number $N_{TB}$ is 1, the available compression level CLavail may be immediately determined as the final compression level CLfinal, as given by Equation (8):

$$CLfinal[h][1] = CLavail[h]. \quad (8)$$

Alternatively, when the required compression level CLreq is higher than the available compression level CLavail, the required compression level CLreq may be changed to be determined as the final compression level CLfinal. For instance, when the transmission block number $N_{TB}$ is at least 2, the required compression level CLreq may be changed using Equation (10) so that the sum of required compression levels CLreq for the respective transmission blocks is less than the product of the available compression level CLavail and the transmission block number $N_{TB}$ as given by Equation (9):

$$\sum_{t=1}^{N_{TB}[h]} CLreq[h][t] \leq CLavail[h] \cdot N_{TB}[h], \text{ and} \quad (9)$$

$$\text{while } \sum_{t=1}^{N_{TB}[h]} CLreq[h][t] > CLavail[h] \cdot N_{TB}[h], \quad (10)$$

for $t = 1 : N_{TB}[h]$ if $CLreq[h][t] \geq CL_1$ then calculate $T_{diff}[t]$, where $T_{diff}[t]$ is an expected difference between a throughput when $CLreq[h][t]$ is used and a throughput when $CLreq-1[h][t]$ is used.

The required compression level CLreq is changed to minimize the difference $T_{diff}[t]$ using the calculated difference $T_{diff}[t]$. For instance, the required compression level $CLreq[h][t]$ for a transmission block giving the least difference $T_{diff}[t]$ may be changed into $CLreq-1[h][t]$ and the changed required compression level CLreq may be determined as the final compression level CLfinal, as given by Equation (11):

$$\text{for } t=1:N_{TB}[h]\text{CLfinal}[h][t]=\text{CLreq}[h][t]. \quad (11)$$

As described above, the required compression level CLreq may be changed to minimize a difference in QM and the changed required compression level CLreq may be determined as the final compression level CLfinal.

Conventionally, whether to compress an LLR signal and an LLR compression level are determined depending on an available HARQ memory size. Since the quality of a received signal is not considered when the LLR compression level is determined, the signal received with a high SNR may be stored without being compressed, wasting HARQ memory and the signal received with a low SNR may be stored after being compressed, deteriorating the reception performance.

According to embodiments of the present invention, the LLR compression level is determined considering the quality of a received signal in order to optimize the reception performance. For instance, when a signal received with a high SNR is compressed a lot when stored in HARQ memory and a signal received with a low SNR is stored in HARQ memory without being compressed, the use of the HARQ memory is optimized and the deterioration of the reception performance due to LLR compression can be alleviated.

Figure 10:
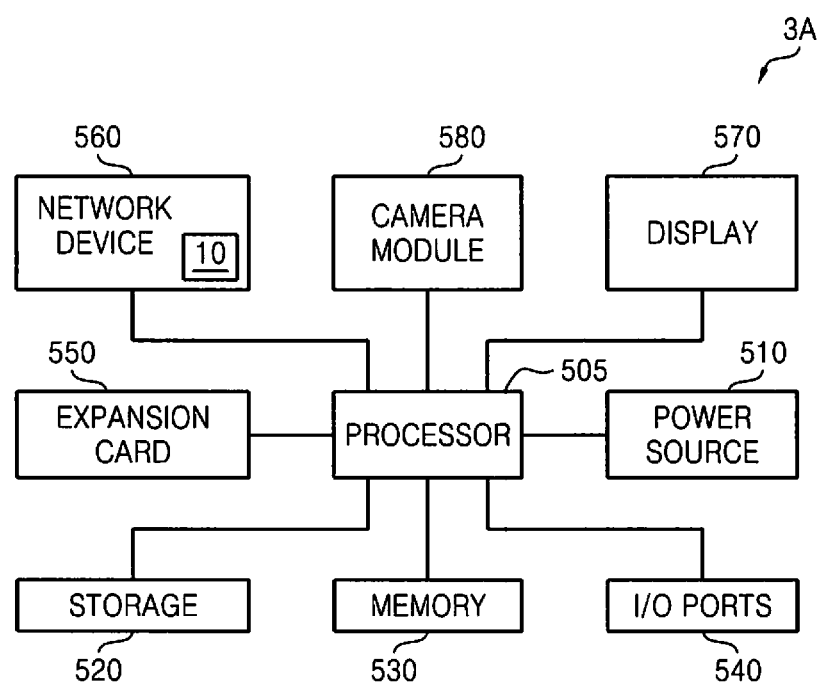
FIG. 10 is a block diagram of a wireless communication device including HARQ processor according to an embodiment of the present invention.

FIG. 10 is a block diagram of a wireless communication device 3A including the HARQ processor 10 according to an embodiment of the present invention. Referring to FIG. 10, the wireless communication device 3A may be implemented as a laptop computer, a cellular phone, a smart phone, a tablet Personal Computer (PC), a Personal Digital Assistant (PDA), an Enterprise Digital Assistant (EDA), a digital still camera, a digital video camera, a Portable Multimedia Player (PMP), a Personal Navigation Device or portable navigation device (PND), a handheld game console, an e-book, and the like.

The wireless communication device 3A includes a processor 505, a power source 510, a storage 520, a memory 530, an input/output (I/O) port 540, an expansion card 550, a network device 560, and a display 570. The wireless communication device 3A may also include a camera module 580.

The processor 505 controls the operation of at least one of the elements 510 through 580. The processor 505 may be implemented as a multi-core processor. The multi-core processor is a single computing component with two or more independent actual processors (referred to as cores). Each of the processors may read and execute program instructions. The multi-core processor can drive a plurality of accelerators at a time, and therefore, the wireless communication device 3A including the multi-core processor may perform multi-acceleration.

The power source 510 supplies an operating voltage to at least one of the elements 505 and 520 through 580. The storage 520 may be implemented as a hard disk drive (HDD) or a solid state drive (SSD).

The memory 530 may be implemented by a volatile or non-volatile memory. According to some embodiments of the present invention, a memory controller (not shown) that controls a data access operation, e.g., a read operation, a write operation (or a program operation), or an erase operation, on the memory 530 may be integrated into or embedded in the processor 505. In other embodiments, the memory controller may be provided between the processor 505 and the memory 530.

The I/O port 540 receives data transmitted to the wireless communication device 3A or transmits data from the wireless communication device 3A to an external device. For instance, the I/O port 540 may be a port for connection with a pointing device such as a computer mouse, a port for connection with a printer, or a port for connection with a Universal Serial Bus (USB) drive.

The expansion card 550 may be implemented as a Secure Digital (SD) card or a MultiMedia Card (MMC). The expansion card 550 may be a Subscriber Identity Module (SIM) card or a Universal SIM (USIM) card.

The network device 560 enables the wireless communication device 3A to be connected with a wired or wireless network and may be referred to as a modem or a modem chip. The network device 560 may include the HARQ processor 10 described above according to some embodiments of the present invention.

The display 570 displays data output from the storage 520, the memory 530, the I/O port 540, the expansion card 550, or the network device 560. The camera module 580 is a module that can convert an optical image into an electrical image. Accordingly, the electrical image output from the camera module 580 may be stored in the storage 520, the memory 530, or the expansion card 550. In addition, the electrical image output from the camera module 580 may be displayed through the display 570.

As described above, according to embodiments of the present invention, a compression level for an LLR signal is changed, so that performance deterioration such as a decrease in throughput due to LLR compression is minimized and HARQ memory is used efficiently. In addition, since the compression level for the LLR signal to be stored in the HARQ memory is determined considering both the quality of a received signal and an available HARQ memory size, the LLR signal is compressed at an optimal LLR compression level, so that the deterioration of reception performance due to LLR compression is minimized and the HARQ memory is efficiently used.

While the present invention has been particularly shown and described with reference to certain embodiments thereof, it will be understood by those of ordinary skill in the art that various changes in forms and details may be made therein without departing from the spirit and scope of the present invention as defined by the following claims and their equivalents.

What is claimed is:

1. A device for receiving and processing a Hybrid Automatic Repeat reQuest (HARQ) signal, the device comprising:
   a combiner configured to receive a retransmitted log likelihood ratio (LLR) signal, and to generate a composite signal by combining the retransmitted LLR signal with a related signal that has been received and previously stored;
   a compression level decision unit configured to calculate a first compression level based on a quality of the composite signal, to calculate a second compression level based on an available memory size, and to decide a final compression level based on the first compression level and the second compression level;
   a compressor configured to compress the composite signal based on the final compression level; and
   a HARQ memory configured to store the compressed signal wherein the compression level decision unit comprises an available compression level calculator configured to calculate the available memory size by subtracting a used memory capacity from a total size of the HARQ memory, and to decide the second compression level based on a highest value among values less than or equal to a value obtained by dividing the available memory size by a number of LLR signals to be stored.

2. The device of claim 1, wherein the compression level decision unit comprises a required compression level calculator configured to calculate a quality metric using at least one of a signal-to-noise ratio (SNR) of the composite signal, a signal-to-interference plus noise ratio (SINR) of the composite signal, a transmission block size, an order of modulation, a code rate, a retransmission count, a channel profile, and a Doppler frequency, and to determine one of predetermined compression levels as the first compression level based on the quality metric.

3. The device of claim 1, wherein the compression level decision unit comprises a required compression level calculator configured to determine, as the first compression level, a compression level corresponding to a highest compression ratio among at least one compression level that maximizes a throughput or an effective signal-to-noise ratio (SNR), or minimizes a block error rate or a bit error rate.

4. The device of claim 1, wherein the compression level decision unit comprises a final compression level decider configured to determine, as the final compression level, a level corresponding to a higher compression ratio among the first compression level and the second compression level.

5. The device of claim 1, wherein the HARQ memory is divided into a plurality of memory regions of a predetermined size, and a signal indicating availability or validity is used for each of the memory regions.

6. The device of claim 1, wherein the HARQ memory comprises at least one of:

an internal memory embedded in the device or embedded in a modem comprising the device; and an external memory provided outside the device or outside the modem comprising the device.

7. The device of claim 1, further comprising a decoder configured to decode the retransmitted LLR signal; and to erase or flush the compressed signal from the HARQ memory, when there is no error in a decoding result.

8. A method of receiving and processing a Hybrid Automatic Repeat reQuest (HARQ) signal, the method comprising:

receiving a retransmitted log likelihood ratio (LLR) signal;

generating a composite signal by combining the retransmitted LLR signal with a related signal that has been received and previously stored;

calculating a required compression level based on a quality of the composite signal;

calculating an available memory size by subtracting a used memory capacity from a total size of a memory;

calculating an available compression level based on a highest value among values less than or equal to a value obtained by dividing the available memory size by a number of LLR signals to be stored, deciding a final compression level based on the required compression level calculated and the available compression level;

compressing the composite signal according to the final compression level; and storing the compressed signal in the memory.

9. The method of claim 8, wherein calculating the required compression level comprises:

calculating a quality metric using at least one of a signal-to-noise ratio (SNR) of the composite signal, a signal-to-interference plus noise ratio (SINR) of the composite signal, a transmission block size, an order of modulation, a code rate, a retransmission count, a channel profile, and a Doppler frequency; and determining one of predetermined compression levels as the required compression level based on the quality metric.

10. The method of claim 8, wherein calculating the required compression level comprises determining, as the required compression level, a compression level corresponding to a highest compression ratio among at least one compression level that maximizes a throughput.

11. The method of claim 8, wherein deciding the final compression level comprises determining, as the final compression level, a level corresponding to a higher compression ratio among the required compression level and the available compression level.

12. The method of claim 8, wherein generating the composite signal comprises:

reading the signal that has been received and previously stored in the memory;

decompressing the signal according to the final compression level; and combining the decompressed signal with the retransmitted LLR signal.

13. The method of claim 8, further comprising setting an occupied bit corresponding to a memory region in which the compressed signal is stored to a particular value.

14. The method of claim 8, further comprising:

decoding the retransmitted LLR signal; and erasing or flushing the compressed signal corresponding to the retransmitted LLR signal from the memory, when there is no error in a result of decoding the retransmitted LLR signal.

15. A wireless communication device comprising:

a demodulator configured to demodulate a received signal and generate a demodulated signal;

a log likelihood ratio (LLR) demapper configured to remap the demodulated signal to an LLR signal of N bits, where N is a real number of at least 1;

a Hybrid Automatic Repeat reQuest (HARQ) processing unit configured to receive the LLR signal, to determine whether the LLR signal is a new signal or a retransmitted signal, and to generate a composite signal by combining the LLR signal with a related signal that has been received and previously stored in a memory when the LLR signal is the retransmitted signal; and a decoder configured to decode the composite signal, wherein the HARQ processing unit calculates an available memory size of the memory by subtracting a used memory capacity from a total size of the memory, decides a second compression level based on a highest value among values less than or equal to a value obtained by dividing the available memory size by a number of LLR signals to be stored, decides a final compression level based on a quality of the composite signal the second compression level, compresses the composite signal according to the final compression level, and stores the compressed signal in the memory.

16. The wireless communication device of claim 15, further comprising a quality parameter detector configured to calculate at least one quality parameter representing the quality of the composite signal.

17. The wireless communication device of claim 16, wherein the quality parameter detector comprises a signal-to-noise ratio (SNR) detector configured to measure an SNR or signal-to-interference plus noise ratio (SINR) of the composite signal.

18. The wireless communication device of claim 16, wherein the quality parameter detector comprises:
   a compression level decision unit configured
     to calculate a first compression level based on the quality of the composite signal,
     to calculate the second compression level based on the available memory size, and
     to decide the final compression level based on the first compression level and the second compression level;
   a compressor configured to compress the composite signal based on the final compression level; and
   a decompressor configured to decompress the compressed signal based on the final compression level.

19. The wireless communication device of claim 18, wherein the compression level decision unit comprises a required compression level calculator configured
   to calculate a quality metric using at least one of a signal-to-noise ratio (SNR) of the composite signal, a signal-to-interference plus noise ratio (SINR) of the composite signal, a transmission block size, an order of modulation, a code rate, a retransmission count, a channel profile, and a Doppler frequency, and
   to determine one of predetermined compression levels as the first compression level based on the quality metric.

20. The wireless communication device of claim 18, wherein the compression level decision unit comprises a final compression level decider configured to determine, as the final compression level, a level corresponding to a higher compression ratio among the first compression level and the second compression level.

21. The wireless communication device of claim 15, wherein the demodulated signal is an M-ary quadrature amplitude modulation (M-QAM) signal.

* * * * *